(12) United States Patent
Watanabe et al.

(10) Patent No.: US 8,131,679 B2
(45) Date of Patent: Mar. 6, 2012

(54) EXCLUSIVE CONTROL METHOD FOR DATABASE AND PROGRAM

(75) Inventors: Satoru Watanabe, Fuchu (JP); Yoshio Suzuki, Kokubunji (JP); Shinji Fujiwara, Sagamihara (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 755 days.

(21) Appl. No.: 11/819,310

(22) Filed: Jun. 26, 2007

(65) Prior Publication Data

US 2008/0288497 A1 Nov. 20, 2008

(30) Foreign Application Priority Data

May 18, 2007 (JP) .................... 2007-132571

(51) Int. Cl.
*G06F 17/30* (2006.01)
(52) U.S. Cl. ........................ 707/640; 707/646
(58) Field of Classification Search ........... 707/999.102, 707/646, 640
See application file for complete search history.

(56) References Cited

U.S. PATENT DOCUMENTS

| 5,347,648 | A * | 9/1994 | Stamm et al. ............... 714/5.11 |
| 2006/0026452 | A1 * | 2/2006 | Suzuki et al. .................... 714/2 |
| 2006/0206538 | A1 | 9/2006 | Veazey |

FOREIGN PATENT DOCUMENTS

| JP | 08-293897 | 4/1995 |
| JP | 2001-229063 | 2/2000 |
| JP | 2003-140951 | 11/2001 |
| JP | 2004-334460 | 5/2003 |
| JP | 2006-48103 | 7/2004 |
| JP | 2006-323826 | 3/2006 |

OTHER PUBLICATIONS

The machine translation of JP2003-140951, Takegawa Hiroshi et al., May 16, 2003, pp. 1-7.*
A translation of Japanese Patent Application Publication document (JP2004334460A), Kageyama et al, published on 2004, pp. 1-6.*

* cited by examiner

*Primary Examiner* — Monica Pyo
(74) *Attorney, Agent, or Firm* — Stites & Harbison, PLLC; Juan Carlos A. Marquez, Esq.

(57) ABSTRACT

A technology capable of preventing a problem which occurs when log writing of a preceding transaction fails while reducing waiting time of a subsequent transaction is provided. A database control method for releasing locking of data held by a transaction upon reception of a transaction completion instruction from an operation terminal or the like by a database is provided. The database includes an exclusive control module, a log output module, and a log buffer. The log output module stores a transaction completion log in the log buffer upon reception of the transaction completion instruction from the operation terminal. The exclusive control module releases locking held by the transaction upon reception of storage of the transaction completion log in the log buffer.

4 Claims, 22 Drawing Sheets

| 201<br>LOGICAL BLOCK ADDRESS | 202<br>DATA CONTENT |
|---|---|
| 0 | "1,40,2,50" |
| 1 | "3,40,4,50" |
| 2 | "5,50,6,70" |
| ⋮ | ⋮ |

FIG. 2

| 301 TABLE NAME | 302 START LBA | 303 FINISH LBA | 304 REFERENCE PERMIT FLAG OF LOCK RELEASED DATA |
|---|---|---|---|
| STOCK | 0 | 7999 | 0 |
| CUSTOMER | 10000 | 17999 | 0 |

FIG. 3

| 401 TABLE NAME | 402 DATA FORM |
|---|---|
| STOCK | ITEM_ID(INT), QUANTITY(INT) |
| CUSTOMER | CUSTOMER_ID(INT), NAME(CHAR[30]) |

FIG. 4

| 1001 TABLE NAME | 1002 IDENTIFICATION COLUMN NAME | 1003 COLUMN VALUE | 1004 TRANSACTION NUMBER | 1005 LOCK STATE |
|---|---|---|---|---|
| STOCK | ITEM_ID | 100 | 1 | 0 |
| STOCK | ITEM_ID | 200 | 2 | 0 |
| ⋮ | ⋮ | ⋮ | ⋮ | ⋮ |

FIG. 10

| 1401 SAVED DATA | 1402 TRANSACTION NUMBER | 1403 TRANSACTION COMPLETION FLAG |
|---|---|---|
| STOCK, ITEM_ID = 1, QUANTITY = 50 | 1 | 1 |
| STOCK, ITEM_ID = 1, QUANTITY = 100 | 2 | 0 |
| | | |

*FIG. 16*

EXCLUSIVE CONTROL METHOD FOR DATABASE AND PROGRAM

CLAIM OF PRIORITY

The present application claims priority from Japanese application P2007-132571 filed on May 18, 2007, the content of which is hereby incorporated by reference into this application.

BACKGROUND OF THE INVENTION

This invention relates to a database control method for managing data of an information system, and more particularly, to a technology of exclusive control of a database.

ACID characteristics (atomicity, consistency, isolation, and durability) are basic characteristics when transactions are processed on the database. The atomicity and the durability are realized by writing a data update record (log) in a storage system. In other words, depending on whether a log of transaction completion has been written in the storage system, completion of a transaction is uniquely decided (atomicity). For the transaction whose log has been written in the storage system, its result is made durable (durability). The isolation is realized by exclusive control of data (lock). In other words, a preceding transaction locks data to limit operations of other transactions for the data, whereby isolation of the transaction is realized.

The database which includes a log output module and an exclusive control module operates as follows. An instruction of a data operation is transmitted from an operation terminal to the database. In the case of a relational database, a data operation is generally instructed by using a SQL sentence. The database operates the data based on the instruction from the operation terminal to give a response to the operation terminal. In this case, the database carries out exclusive control of data to limit data operations of other transactions. When finishing the transaction, the operation terminal transmits a transaction finish instruction (commit instruction) to the database. The database writes logs of the data operation and transaction completion in the storage system. Upon completion of writing of the logs in the storage system, the database releases the data lock, and notifies the transaction completion to the operation terminal.

In place of the locking technology, a multi version concurrency control (MVCC) technology may be used. According to the MVCC technology, data before updating is saved in a saving area when data is updated. Subsequent transactions are carried out by using the data of the saving area. By using the MVCC technology, exclusive waiting time of the subsequent transactions is shortened, and execution parallelism of the transactions is improved.

In the case of a database used for remotely backing-up data using remote copying of a storage system, a log is transferred to a remote site, which leads to a problem of long log output time. Thus, a multiple log transfer technology of preparing a plurality of log buffers in the database and sequentially outputting contents of the log buffers to a storage system is used. By using the multiple log transfer technology, log output efficiency can be increased.

The log output module of the database is described in JP 2006-323826 A. The locking module of the database is described in JP 2004-334460 A. The MVCC technology is described in JP 2003-140951 A. The remote backing-up of data using the remote copying of the storage system is described in JP 2006-48103 A.

SUMMARY OF THE INVENTION

As described above, in the database system, the log writing in the storage system plays an important role. In this case, for the storage system, a magnetic storage system (hard disk drive) or a nonvolatile memory is used. Certain time is necessary for writing logs in the storage system. The log writing time causes extension of data locking time. The extension of locking time leads to extension of waiting time of subsequent transactions, causing a reduction in performance of the database system.

To reduce an influence of the log writing time in the storage system, the data locking may be released by taking the opportunity of the transaction completion instruction from the operation terminal. Thus, as the locking can be released without waiting for storage of logs in the storage system, waiting time of subsequent transactions can be shortened.

In such a case, however, the following problem occurs. When log writing of a preceding transaction fails, a data operation of the preceding transaction is made invalid. Thus, data updated by the preceding transaction is invalid, and in a subsequent transaction which refers to this data, invalid data is referred to.

A first object of this invention is to provide a technology of preventing the aforementioned problem when log writing of a preceding transaction fails while reducing data locking time caused by log writing time.

When data updated by the preceding transaction is updated by a subsequent transaction, a problem can be prevented as follows. That is, no problem occurs if a subsequent transaction is made invalid when the log writing of the preceding transaction fails. Accordingly, this invention provides a technology of preventing an inconvenience which occurs when the subsequent transaction refers to the data.

Even if the MVCC technology described in the background art is used, a similar problem occurs when log writing of the preceding transaction fails. According to the MVCC technology, the subsequent transaction refers to data saved in a saving area and yet to be updated. However, when log writing of the preceding transaction which has updated the data fails, its data operation is invalid. Thus, the data updated by the preceding transaction is invalid data, and in the subsequent transaction which refers to the data, invalid data is referred to.

A second object of this invention is to provide a technology of preventing the aforementioned problem which occurs when the log writing of the preceding transaction fails if the MVCC technology is used.

In the case of the database of the background art used for remotely backing-up data using the remote copying, the multiple log transfer technology is used. When the multiple log transfer technology is used, a data update log may precedingly be transferred, and a transaction completion log may subsequently be transferred. In such a situation, when only outputting of a subsequent transaction completion log succeeds while transfer of a preceding data update log fails, irrespective of a loss of the data update log, the transaction may be judged to be completed.

A third object of this invention is to provide a technology of preventing the aforementioned problem which occurs when preceding log writing fails when the multiple log transfer technology is used.

This invention provides a database control method for releasing locking of data held by a transaction upon reception of a transaction completion instruction from an operation terminal or the like by a database. The database includes an exclusive control module, a log output module, and a log buffer. The log output module stores a transaction completion log in the log buffer upon reception of a transaction completion instruction from the operation terminal. The exclusive control module releases locking held by the transaction upon storage of the transaction completion log in the log buffer.

The exclusive control module carries out exclusive control by adding an attribute "LOCKED" or "RELEASED" to the data lock. Upon reception of an operation instruction of the data having a lock of "RELEASED" from the operation terminal, the database judges whether the operation instruction is a reference instruction or an update instruction. The database stands by until the locking is released if the operation instruction is a reference instruction, and updates data if the operation instruction is an update instruction.

The operation terminal can add an attribute of "REFERENCE TO LOCK RELEASED DATA IS PERMITTED" to the reference instruction, and an attribute of "REFERENCE DURING RELEASED LOCKING IS PERMITTED" to the data.

The database further includes a data saving area. The exclusive control module saves data before updating in the data saving area when the data is updated. The database refers to the data of the data saving area when a reference instruction to the data of another transaction is received. In this case, the reference instruction is executed by using data updated by a latest transaction among transactions whose completion logs have been output to the storage system.

In the case of using multiple log transfer, the log output module judges completion of the log outputting if outputting of all preceding logs has been completed.

According to this invention, it is possible to execute the update instruction of the subsequent transaction while preventing a problem that the subsequent transaction refers to illegal data. Thus, exclusive waiting time of the subsequent transaction can be reduced. Hence, performance of the database system can be improved.

By adding an attribute of "REFERENCE TO LOCK RELEASED DATA IS PERMITTED" to the reference instruction, and an attribute of "REFERENCE DURING RELEASED LOCKING IS PERMITTED" to the data, it is possible to execute the reference instruction of the subsequent transaction without waiting for log outputting of the preceding transaction, whereby exclusive waiting time of the subsequent transaction can be shortened.

By deciding data to be saved in the data saving area depending on an output situation of the transaction completion log, it is possible to prevent an inconvenience when the log outputting fails. In other words, by selecting data of the transaction whose completion log has been output to the storage system to execute the reference instruction, a possibility that data made invalid when log outputting fails is referred to be eliminated.

Only when outputting of all the preceding logs is completed, by judging that the log outputting has been completed, the aforementioned problem which occurs when the multiple log transfer technology is used is prevented.

BRIEF DESCRIPTION OF THE DRAWINGS

FIG. 2 is an explanatory diagram showing an example of storing data in a storage system according to the first embodiment.

FIG. 3 is an explanatory diagram showing an example of stored contents of a data area management table according to the first embodiment.

FIG. 4 is an explanatory diagram showing an example of stored contents of a data form management table according to the first embodiment.

FIG. 10 is an explanatory diagram showing an example of stored contents of a lock management table according to the first embodiment.

FIG. 16 is an explanatory diagram showing stored contents of a data saving area according to the second embodiment.

DETAILED DESCRIPTION OF THE PREFERRED EMBODIMENTS

An embodiment of this invention will be described below using the accompanying drawings.

Figure 1:
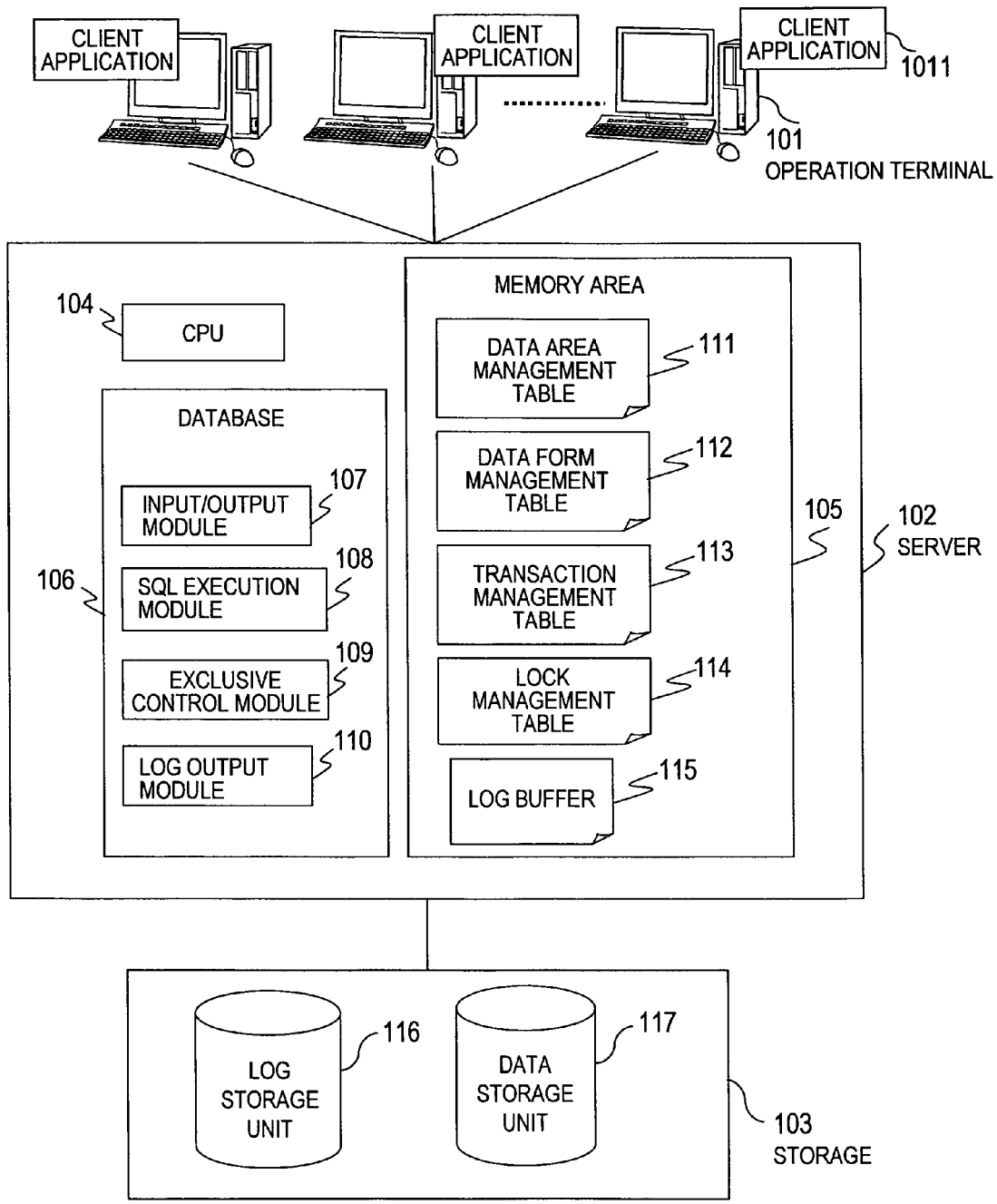
FIG. 1 is a block diagram showing a configuration of a system according to a first embodiment of this invention.

FIG. 1 is a diagram showing a configuration of a computer system according to a first embodiment of this invention. The computer system of FIG. 1 includes an operation terminal 101, a server 102, and a storage system 103. The operation terminal 101 and the server 102, and the server 102 and the storage system 103 are connected to each other via a network, respectively. The server 102 can be connected to a plurality of operation terminals 101. The server 102 includes a central processing unit (CPU) (processor) 104 for executing an arithmetic operation, and a memory 105 for storing programs or data. A database 106 (database management system) is a program executed by the server 102, and realized by executing the program stored in the memory 105 by the CPU 104.

The operation terminal 101 executes a client application 1011. The client application 1011 is a program for transmitting a data operation instruction to the database 106 of the server 102, and receiving a response from the database 106. The operation terminal 101 can transmit a data reference instruction, an update instruction, and a commit instruction to the database 106.

The storage system 103 stores a log storage unit 116 and a data storage unit 117 by using a hard disk drive or a storage system such as a nonvolatile semiconductor.

FIG. 2 schematically shows a method for storing the log storage unit 116 and the data storage unit 117 in the storage system 103. The storage system 103 manages a storage area of the hard disk drive or the like by dividing it into areas of certain sizes such as 512 bytes, and adds an address 201 to each area. This address may be called a logical block address (LBA). FIG. 2 shows an example where data "1, 40, 2, and 50" are stored in an area of an address 0, data "3, 40, 4, and 50" are stored in an area of an address 1, and data "5, 50, 6, and 70" are stored in an area of an address 2. The server 2 can operate data stored in the storage system by designating those addresses.

The database 106 stores a data area management table 111, a data form management table 112, a transaction management table 113, a lock management table 114, and a log buffer 115 in the memory 105 (memory area shown in FIG. 1).

The data area management table 111 stores a table name and a storage position for storing data. FIG. 3 shows an example of stored contents of the data area management table 111. The data area management table 111 stores a table name 301, a start LBA 302, a finish LBA 303, and a reference permission flag 304 of lock released data. The table name 301 stores a name for identifying a table. The start LBA 302 stores a logical block address indicating a start position in the storage system 103 which stores the table. The finish LBA 303 stores a logical block address indicating a finish position in the storage system 103 which stores the table. The reference permission flag 304 stores a flag indicating permission or nonpermission of data reference of other transactions when a data lock attribute is a released state. "0" of the reference permission flag 104 indicates nonpermission, and "1" of the reference permission flag 304 indicates permission.

In the example of FIG. 3, data corresponding to the table name 301 "STOCK" are stored from an LBA number 0 to an LBA number 7999, and data corresponding to the table name 302 "CUSTOMER" are stored from an LBA number 10000 to an LBA number 17999.

The data form storage table 112 stores a form of data for each table. FIG. 4 shows an example of stored contents of the data form storage table 112. In the data form storage table 112, a table name 401 which stores a name for identifying a table, and a data form 402 which stores a form of data in the table are described. In the example of FIG. 4, Item_ID and Quantity are stored in integer forms (INT) in a Stock table of the table name 401, and Customer_ID is stored in an integer form and Name is stored by 30 character strings (CHAR [30]) in a Customer table of the table name 401. The Item_ID, the Quantity, the Customer_ID, and the Name may be called column names.

The database 106 can execute a SQL sentence by using the data area management table 111 and the data form management table 112. For example, a SQL sentence of "SELECT Quantity FROM Stock Where Item_ID=1" is an instruction to refer to a value of Quantity of Item_ID 1 of "Stock" table. Upon reception of such an instruction, the database 106 obtains an LBA number storing the Stock table from the data area management table 111 to read data from the storage system 103. Then, referring to a data form described in the data form management table 112, the database 106 refers to data corresponding to "Item_ID=1".

The example of the method for executing the SQL sentence by the database 106 has been described. The database 106 can similarly execute an UPDATE sentence for updating data, a DELETE sentence for deleting data, and an INSERT sentence for inserting data in addition to a SELECT sentence for referring to data.

The operation terminal 101 shown in FIG. 1 transmits an instruction to the input/output module 107, and operates the data storage unit 117 stored in the storage system 103. A series of data operations are managed in transaction units. When a transaction is started, the operation terminal 101 transmits a transaction start instruction to the input/output module 107 of the database 106. When the transaction is finished, the operation terminal 101 transmits a transaction finish instruction to the input/output module 107.

Figure 5:
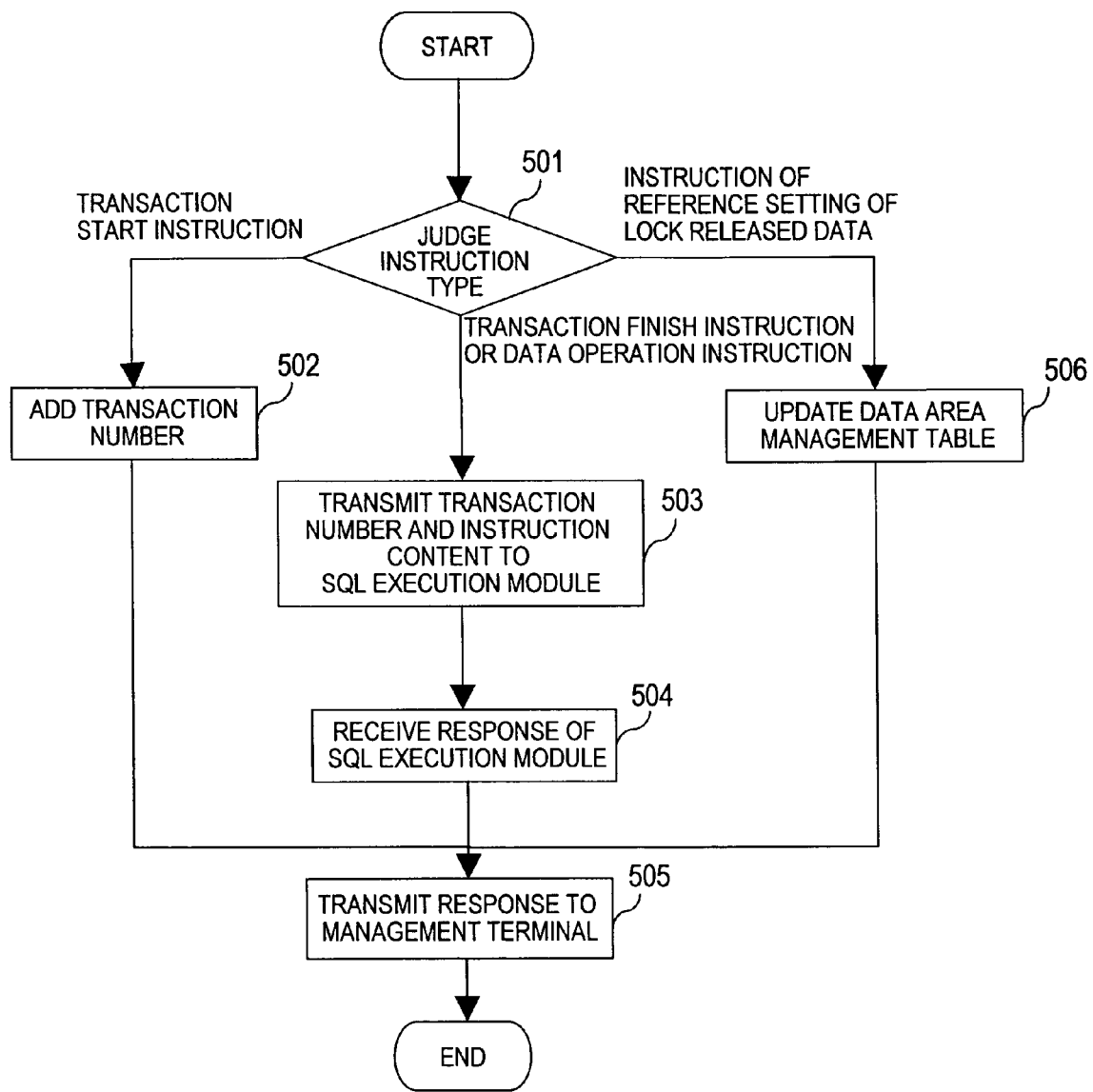
FIG. 5 is a flowchart showing an example of a process executed by an input/output module according to the first embodiment.

FIG. 5 is a flowchart showing an operation of the input/output module 107 of the database 106. Upon reception of an instruction from the operation terminal 101, the input/output module 107 judges a type of received instruction in Step 501.

If the instruction received from the operation terminal 101 is a transaction start instruction, numbers are added to transactions in Step 502. The input/output module 107 stores a new transaction and an identifier of the operation terminal 101 in the transaction management table 113 for managing correspondence between the operation terminal 101 and the transaction numbers. Then, in Step 505, starting of the instructed transactions is transmitted to the operation terminal 101.

If the instruction received from the operation terminal 101 is a data operation instruction or a transaction finish instruction, in Step 503, the transaction numbers and instruction contents are transmitted to a SQL execution module 108. A response to the instruction is received from the SQL execution module 108 in Step 504. The response from the SQL execution module 108 is transmitted to the operation terminal 101 in Step 505. The input/output module 107 refers to the transaction management table 113 to transmit a response to transactions executed by the SQL execution module 108 to the operation terminal 101 corresponding to the transaction numbers.

If the instruction received from the operation terminal 101 is a reference permission setting instruction for lock released data, in Step 506, the reference permission flag (reference permission attribute) 304 of the data area management table 111 is updated. The reference setting instruction of the lock released data is given in a form of "SET TABLE STOCK LOCK REFER YES". This is an instruction of permitting reference from other transactions for data corresponding to a table name "STOCK" even in a lock released state. When such an instruction is received, the reference permission flag 304 of lock released data corresponding to the table name "STOCK" of the data area management table 111 shown in FIG. 3 is set to "1". An instruction of "SET TABLE STOCK LOCK REFER NO" is an instruction for inhibiting data reference when data corresponding to the table name "STOCK" is lock released. When such an instruction is received, in Step 506, the reference permission flag 304 of lock released data corresponding to the table name "STOCK" of the data area management table 111 shown in FIG. 4 is set to "0".

Figure 6:
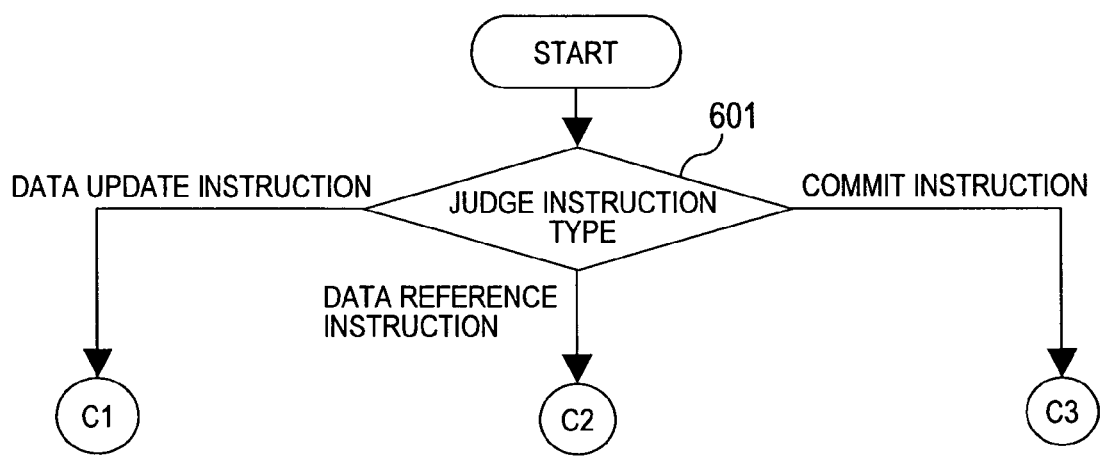
FIG. 6 is a flowchart showing an example of a first half of a process executed by a SQL execution module according to the first embodiment.

FIG. 6 is a flowchart showing an operation of the SQL execution module 108. The SQL execution module 108 starts its operation upon reception of a transaction number and instruction contents from the input/output module 107. The SQL execution module 108 judges a type of the received instruction in Step 601. As instruction types, there are a data update instruction, a data reference instruction, and a commit instruction. The data update instruction indicates an UPDATE sentence, an INSERT sentence, or a DELETE sentence of a SQL sentence, and the data reference instruction indicates a SELECT sentence of the SQL sentence.

Figure 7:
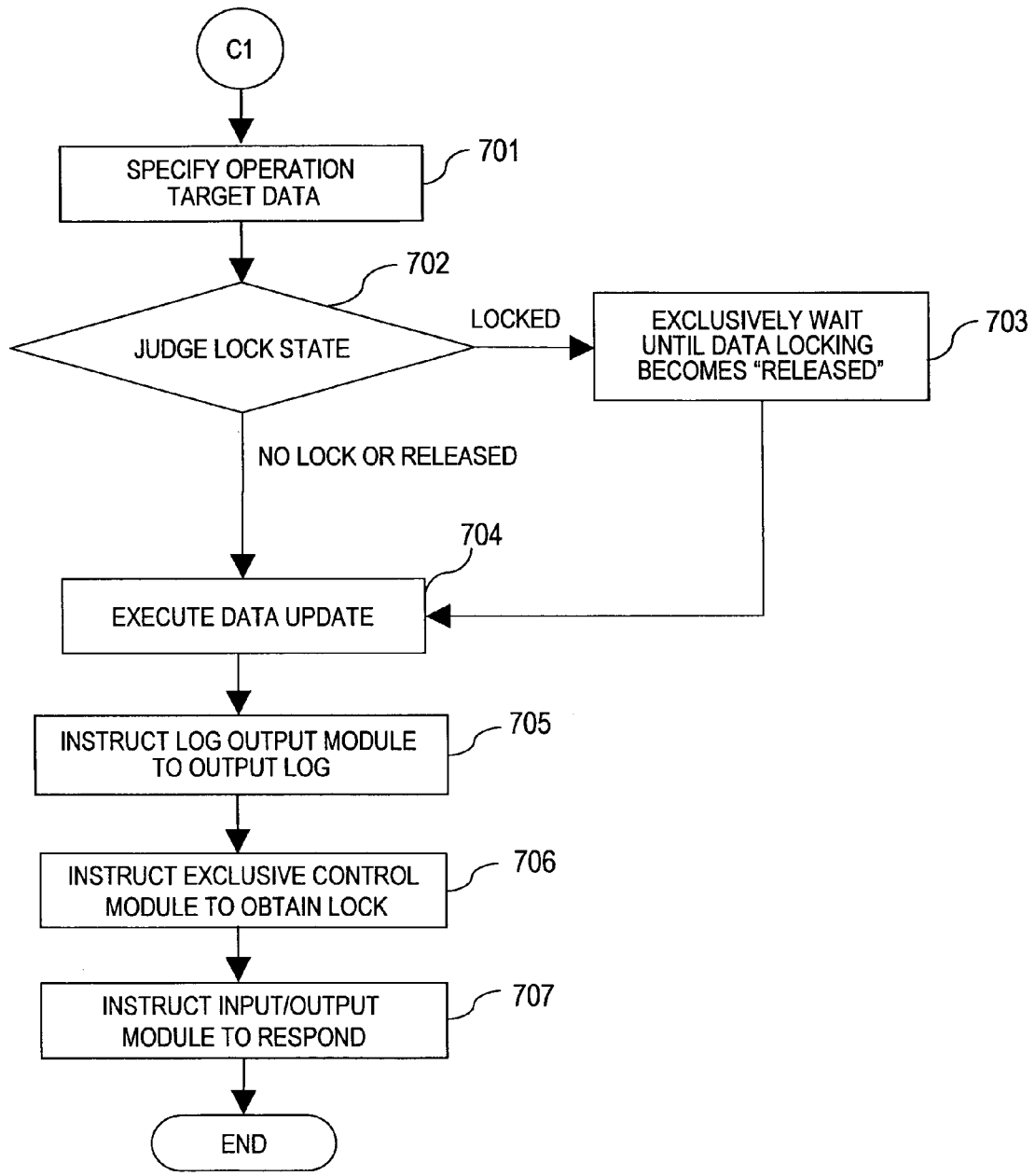
FIG. 7 is a flowchart showing an example of a data update process executed by the SQL execution module according to the first embodiment.

FIG. 7 is a flowchart showing an operation of the SQL execution module 108 when the data update instruction is received. In Step 701, data of an operation target of the data update instruction is specified. For example, the date update instruction is given in a form of "UPDATE STOCK SET Quantity=100 WHERE Item_ID=1". This is an instruction to update a Quantity value of data corresponding to "Item_ID=1" of a "Stock" table to 100. It can be understood from this instruction that the data of the "Item_ID=1" of the "Stock" table is data of an operation target. Accordingly, in Step 701, data of an operation target is specified from instruction contents received from the input/output module 107. In Step 702, a lock state of the data storage unit 117 is judged by referring to the lock management table 114 shown in FIG. 10. In the lock management table 114, information of locked data storage unit 117 is described.

FIG. 10 shows an example of stored contents of the lock management table 114. The lock management table 114 stores a table name 1001 for storing a name of a table of the data storage unit 117, an identification column name 1002 for storing a column identifier in the table, a column value 1003 indicating a value of data (record) corresponding to the identification column name 1002, a transaction number 1004 for storing a transaction number taking this data as an operation target, and a lock state 1005 indicating whether the data is locked. Each of the table name 1001, the identification column name 1002, and the column value 1003 is information to specify locked data. In the transaction number 1004, a transaction number which has obtained a lock of the data is described. In the lock state 1005, a lock state ("LOCKED" or "RELEASED") is described. "0" of the lock state 1005 indicates "LOCKED", and "1" of the lock state 1005 indicates "RELEASED". In the example of FIG. 10, data where an identification column name "Item_ID" of the table name "Stock" is a value "100" is given a lock of "LOCKED" by a transaction of the transaction number "1".

Then, in Step 702 of FIG. 7, the process branches to Step 703 if the data of the operation target is "LOCKED", and to Step 704 if the data of the operation target is "RELEASED" or "NO LOCK". When there is no entry of operation target data in the lock management table 114, the SQL execution module 108 proceeds to Step 704 by judging "NO LOCK". In Step 703, the SQL execution module 108 stands by until a lock state of the data of the operation target becomes "RELEASED". In Step 704, the SQL execution module 108 executes data updating of the operation instruction. In the example of the UPDATE sentence, the SQL execution module 108 updates a Quantity value of the data corresponding to the "Item_ID=1" of the "Stock" table stored in the storage system 103 to 100. Then, in Step 705, a log output module 110 is instructed to output a log of the data updating to the log buffer 115. In the example of the UPDATE sentence, the log output module 110 is instructed to output a transaction number and a log of "update a Quantity value of data corresponding to Item_ID=1 of Stock table to 100".

In Step 706, an exclusive control module 109 is instructed to obtain a lock. In the example of the UPDATE sentence, a transaction number and an instruction of "change a lock state of data corresponding to Item_ID=1 of Stock table to locked state" are transmitted to the exclusive control module 109. In Step 707, the input/output module 107 is instructed to give a response indicating that a data operation has been completed. This instruction contains a transaction number. The input/output module 107 which has received the instruction refers to the transaction management table 113 to give a response to the operation terminal 101 which has instructed the data operation.

Figure 8:
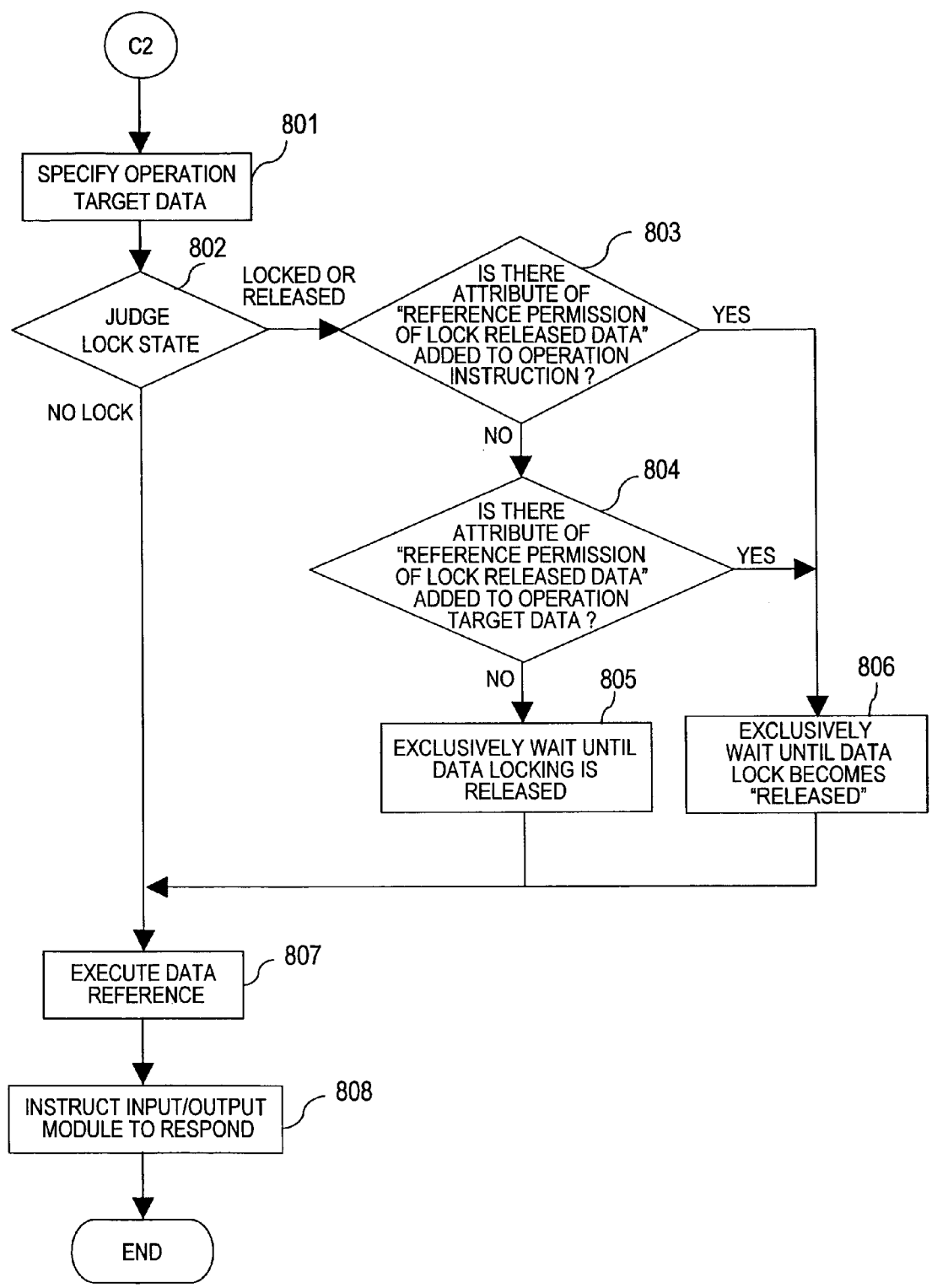
FIG. 8 is a flowchart showing an example of a reference process executed by the SQL execution module according to the first embodiment.

FIG. 8 is a flowchart showing an operation of the SQL execution module 108 when the data reference instruction is received. In Step 801, data of an operation target of data reference is specified. For example, the data reference instruction is given in a form of "SELECT Quantity FROM STOCK WHERE Item_ID=1". This is an instruction to refer to a Quantity value of data corresponding to "Item_ID=1" of the "Stock" table. It can be understood from this instruction that the "Item_ID=1" of the "Stock" table is data of an operation target. Accordingly, in Step 801, data of an operation target is specified from instruction contents received from the input/output module 107. In Step 802, a lock state of the data of the operation target is judged by referring to the lock management table 114.

If there is no entry of the above-mentioned data in the lock management table 114, the process judges no lock and branches to Step 807. If there is an entry of relevant data in the lock management table 114, the process branches to Step 803. In Step 803, whether there is a reference permission attribute of lock released data added to the data reference operation instruction is judged. The operation terminal 101 can add a reference permission attribute to the lock released data to the data reference instruction. For example, the instruction is designated in a form of "SELECT Quantity FROM STOCK WHERE Item_ID=1 LOCK REFER YES".

In Step 803, whether there is a designation of "LOCK REFER YES" in the data operation instruction is judged. If there is the designation of this attribute, the process branches to Step 804. If there is no designation of this attribute, the process proceeds to Step 806. In Step 804, whether there is a reference permission attribute of lock released data added to the operation target data is judged. This judgment is made by referring to the reference permission flag 304 of lock released data of the data area management table 111 shown in FIG. 3. If the data reference permission flag 304 of the table storing the relevant data is set to "1", the process proceeds to Step 806 by judging that reference is permitted to the data whose lock attribute is a released state. If the reference permission flag 304 is "0", the process proceeds to Step 805 as released data reference is not permitted.

In Step 805, the process stands by until locking of the data of the operation target is released. The releasing of the locking of the data of the operation target can be judged based on a discovery that there is no more entry of the relevant data in the lock management table 114. In other words, the SQL execution module 108 monitors the lock management table 114, and judges releasing of the locking of the relevant data when the entry of the data of the operation target is deleted from the lock management table 114.

In Step 806, the SQL execution module 108 stands by until the lock of the data becomes "RELEASED". "RELEASED"

of the lock of the data is determined when a lock state 1005 of the lock management table 114 is set to "1".

In Step 807, data of an operation target is read from the storage system 103. In Step 808, the input/output module 107 is instructed to return the data read from the storage system 103. This instruction contains a transaction number. The input/output module 107 refers to the transaction management table 113 to give a response to the operation terminal 101 which has instructed the data operation.

Figure 9:
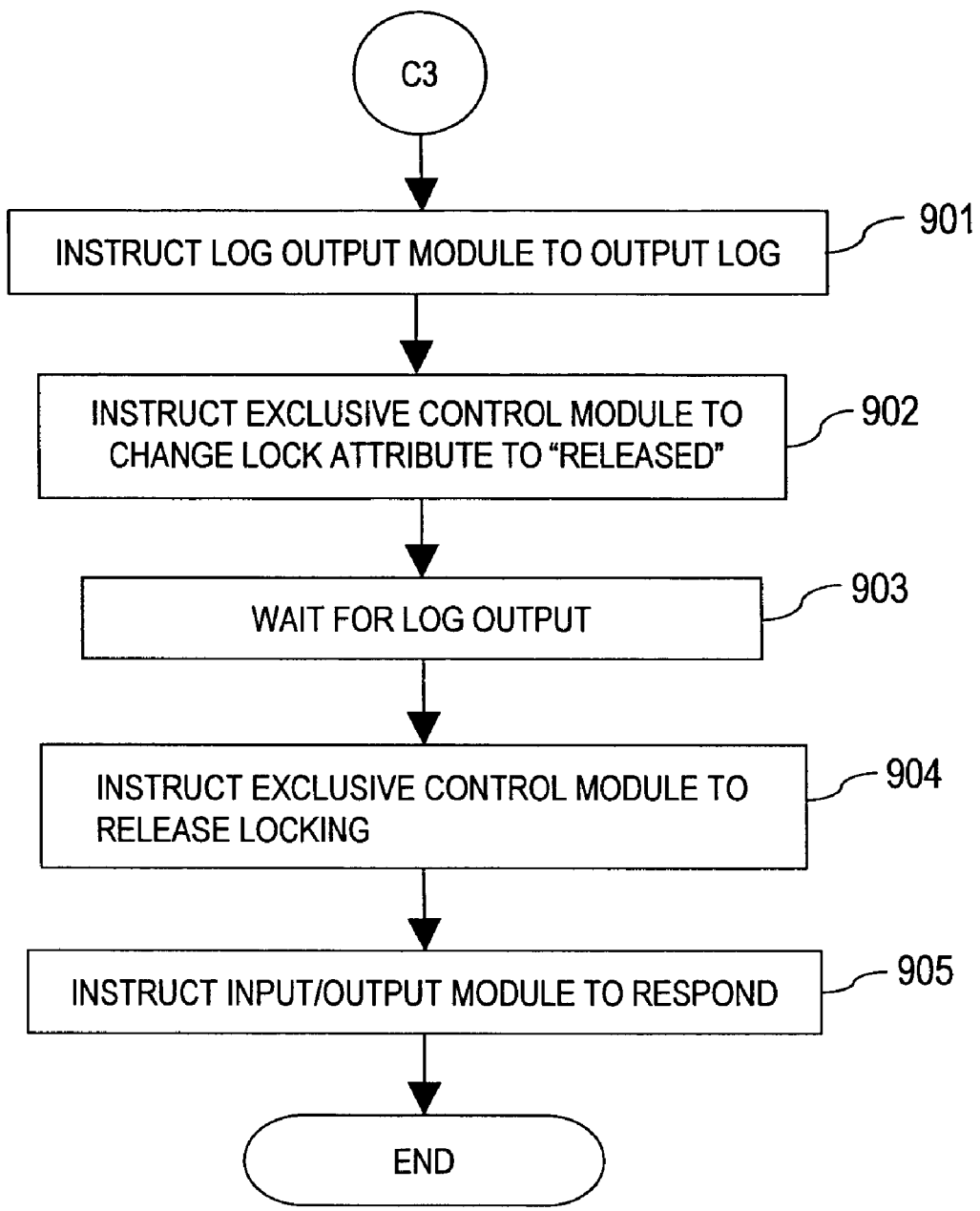
FIG. 9 is a flowchart showing an example of a commit process executed by the SQL execution module according to the first embodiment.

FIG. 9 is a flowchart showing an operation of the SQL execution module 108 when a commit instruction is received from the operation terminal 101. In Step 901, a transaction number and an instruction of outputting a transaction completion log are transmitted to the log output module 110.

In Step 902, the exclusive control module 109 is instructed to change a lock attribute to "RELEASED". This instruction is for changing the lock states of all data held by commit transactions to "RELEASED". In Step 903, the process stands by until the outputting of the transaction completion log instructed to the exclusive control module 109 in Step 901 is completed. In other words, the SQL execution module 108 stands by until a notification of completion of writing of the transaction completion log in the log buffer 115 is received from the exclusive control module 109.

In Step 904, the exclusive control module 109 is instructed to release locking of data locked by the transaction. This instruction is for releasing all locks obtained by a commit transaction.

In Step 905, the input/output module 107 is instructed to return commit completion. Upon reception of this instruction, the input/output module 107 gives a response indicating commit completion to the operation terminal 101 which has instructed the data operation.

Figure 11:
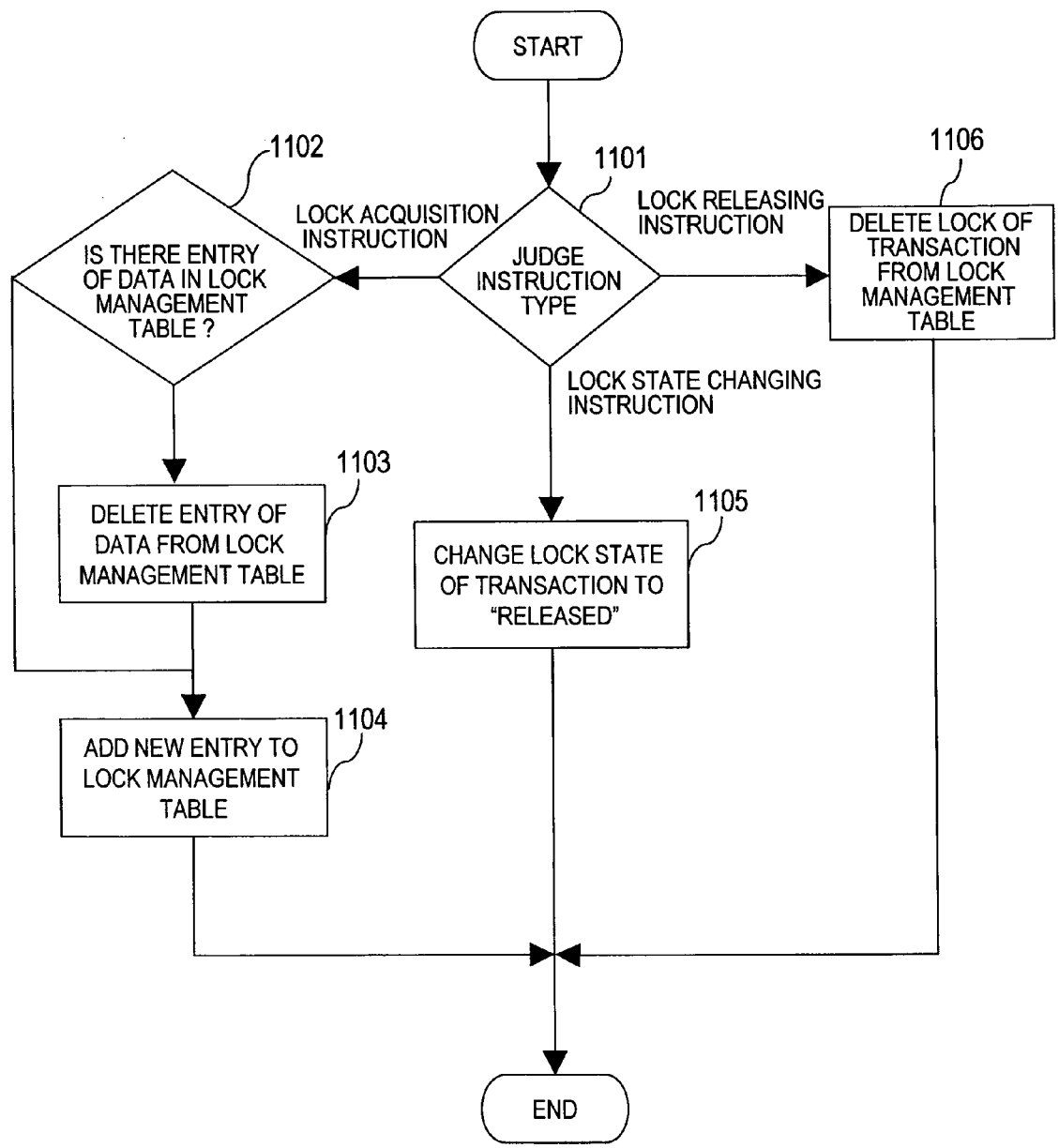
FIG. 11 is a flowchart showing an example of a process executed by an exclusive control module according to the first embodiment.

FIG. 11 is a flowchart showing an operation of the exclusive control module 109. The exclusive control module 109 starts its operation by receiving an instruction regarding exclusive control from the SQL execution unit 108. As instructions which the exclusive control module 109 receives from the SQL execution unit 108, there are a lock acquisition instruction, a lock state changing instruction, and a lock releasing instruction. For example, the lock acquisition instruction is: "transaction 1 obtains a lock of data of Item_ID=1 of Stock table". The lock state changing instruction is: "lock of transaction 1 is changed to released state". The lock releasing instruction is: "locking of transaction 1 is released". In Step 1101, a type of an instruction received from the SQL execution unit 108 is judged. The process proceeds to Step 1102 if the received instruction is a lock acquisition instruction. The process proceeds to Step 1105 if the received instruction is a lock state changing instruction. The process proceeds to Step 1106 if the received instruction is a lock releasing instruction.

In Step 1102, whether data of the lock acquisition instruction has been registered in the lock management table 114 is judged. In the example of the lock acquisition instruction, whether "data of Item_ID=1 of Stock table" has been registered in the lock management table 114 is judged. If there is an entry of the data in the lock management table 114, in Step 1103, the entry is deleted from the lock management table 114. In Step 1104, the exclusive control module 109 adds an entry of data which becomes a target of the received instruction to the lock management table 114 according to the received instruction contents. In this case, the exclusive control module 109 sets the lock state 1005 of the newly added entry to "0", and a lock state to "LOCKED".

Upon the reception of the lock state changing instruction from the SQL execution unit 108, the exclusive control unit 109 changes the lock management table 114 in Step 1105, and changes a lock attribute of the transaction from "LOCKED" to "RELEASED". In other words, the exclusive control module 109 sets the lock state 1005 of the lock management table 114 to "1" to change a data lock attribute of the transaction number 1004 from "LOCKED" to "RELEASED".

When the exclusive control module 109 receives the lock releasing instruction, the process proceeds to Step 1106 to change the lock management table 114, and to delete a lock of transaction from the lock management table. In other words, the exclusive control module 109 deletes the entry of the transaction number 1004 from the lock management table 114 to change the lock of the data to a state completely free from "RELEASED".

Figure 12:
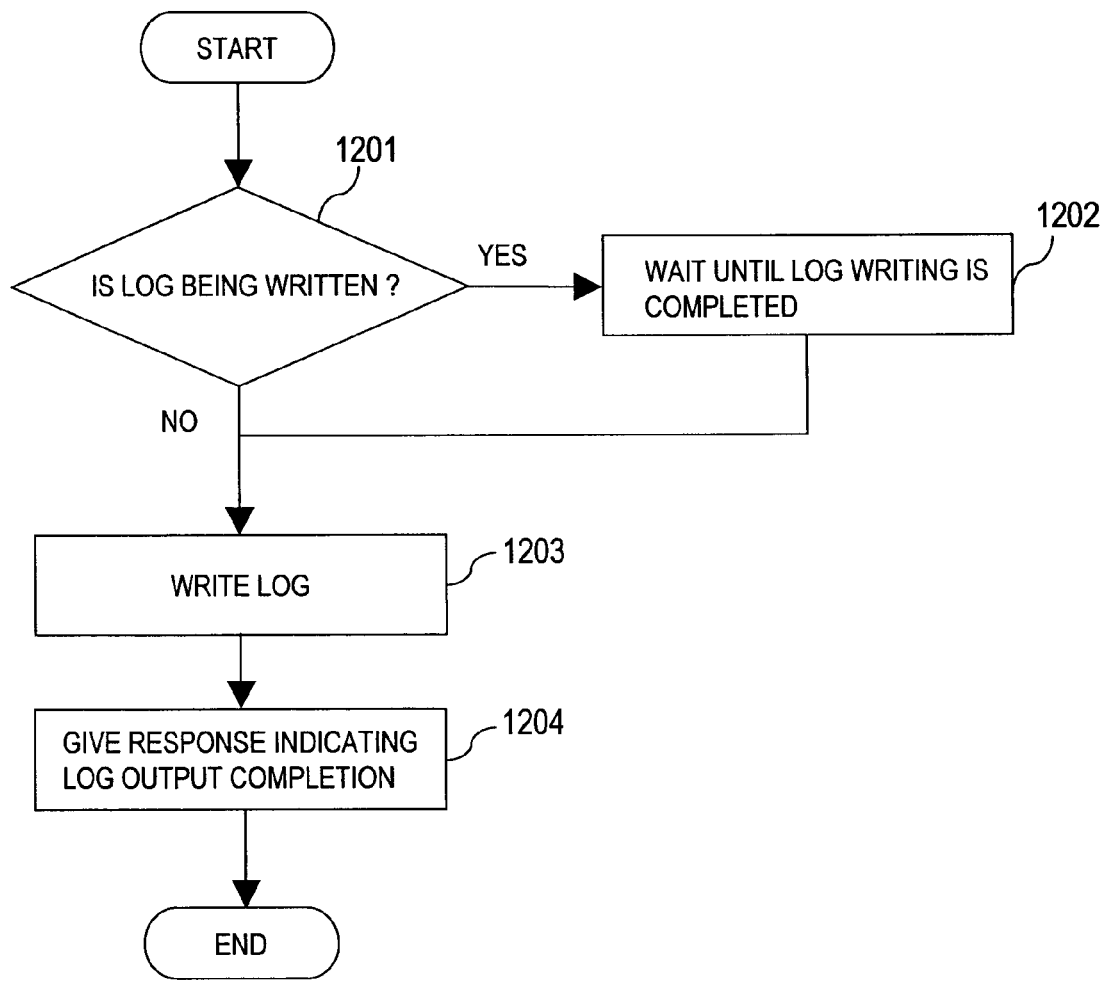
FIG. 12 is a flowchart showing an example of a process executed by a log output module according to the first embodiment.

FIG. 12 is a flowchart showing an operation of the log output module 110. The log output module 110 generates a log to add it to the log storage unit 116 of the storage system 103 according to an instruction from the SQL execution unit 108.

In Step 1201, whether a log is being written in the storage system 103 is judged. If the log is being written, the process stands by until completion of the log writing in Step 1202. The log output module 110 can receive an instruction from the SQL execution unit 108 even while standing by until completion of the log writing, and writes logs instructed from the SQL execution unit 108 en bloc as soon as the log writing is completed.

In Step 1203, the log stored in the log buffer 115 of the memory 105 is written in the log storage unit 116 of the storage system 103. The log written by the log output module 110 is a content such as "transaction 1 changes Quantity of Item_ID=1 of Stock table to 100" or "completion of transaction 1".

In Step 1204, the completion of the log outputting from the log buffer 115 to the log storage unit 116 of the storage system 103 is responded to the SQL execution module 108. Upon the completion of outputting the log to the storage system 103 by the log output module 110, contents of the log buffer 115 of the memory 105 can be cleared.

Figure 13:
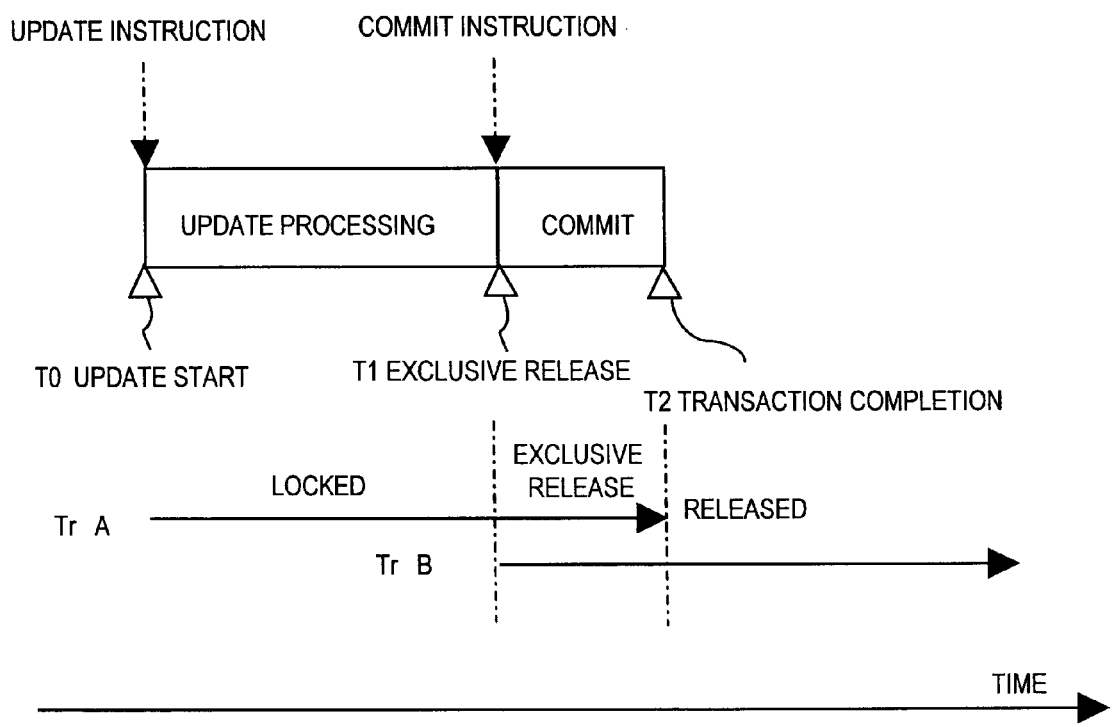
FIG. 13 is a graph showing a relation between a locked state and time in a data update process according to the first embodiment.

FIG. 13 is a time chart showing a flow of a series of transactions which the database 106 receives from the operation terminal 101. FIG. 13 shows an example of a transaction where the database 106 executes a commit process after it updates data (record) of the data storage unit 117.

At time T0, the database 106 receives an update instruction of released data of the data of storage unit 117 from the operation terminal 101 to start an update process. The SQL execution module 108 instructs the exclusive control module 109 to lock the data, and inhibits access of other transactions to the data. At time T1, the database 106 receives a commit instruction for the updated data of the data storage unit 117 from the operation terminal 101 to start a commit process.

As shown in FIG. 9, the SQL execution module 108 instructs the log output module 110 to output a log of the commit process, and then changes a lock attribute of "LOCKED" data to "RELEASED". Accordingly, a series of transactions A including the update process and the commit process can release locking of data of a target of the transactions A with a limit before the commit process completes, and permit access of a subsequent transaction B to the data.

Figure 14:
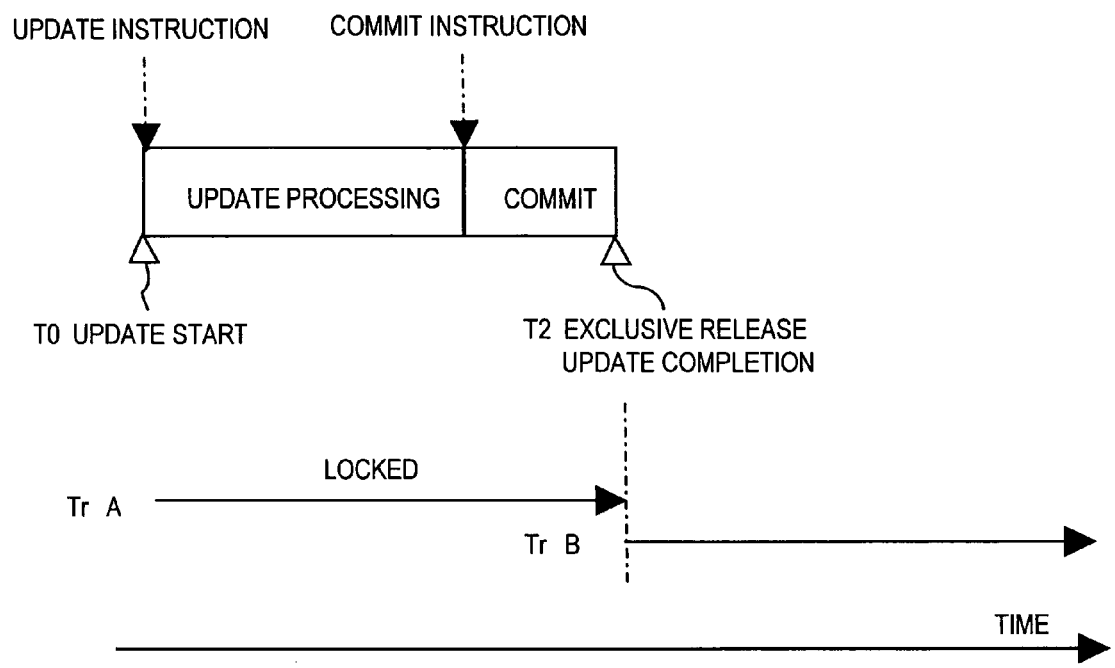
FIG. 14 is a graph showing a relation between a locked state and time in a data update process according to a conventional example.

Thus, the performance of the database 106 can be improved by shortening a period necessary for the transaction to exclusively lock the data. The SQL execution module 108 does not release the locking until time T2 when the log writing in the log storage unit 116 by the storage system 103 is completed, and a notification of the completion is transmitted to the input/output module 107. Accordingly, even when the log wiring in the storage system 103 fails, a loss of data consistency can be prevented. The SQL execution module 108 executes an update instruction or a reference instruction having a lock released data reference permission attribute for the data whose lock attribute is a released state. Thus, lock releasing is made partial to prevent a loss of data consistency when the log writing of the transaction fails. On the other hand, according to the conventional example, as shown in FIG. 14, a locked state is maintained from time T0 for starting updating to time T2 for completing a commit process. In consequence, the subsequent transaction B cannot access the data until the time T2 and after, and the performance of the database is lowered as compared with this invention.

The example of adding the reference permission attribute of the lock release data to the reference instruction has been described. However, a reference permission attribute of the lock released date may be added to the data stored in the data storage unit 117, thereby obtaining the same operations and effects as those described above.

The database 106 can receive a reference permission instruction of the lock released data from the operation terminal 101, and permit reference to the released data for a reference instruction after the reception of this instruction. A user of the operation terminal 101 can control the reference instruction of the lock released data according to a load of the database 106 or the server 102.

Second Embodiment

Figure 15:
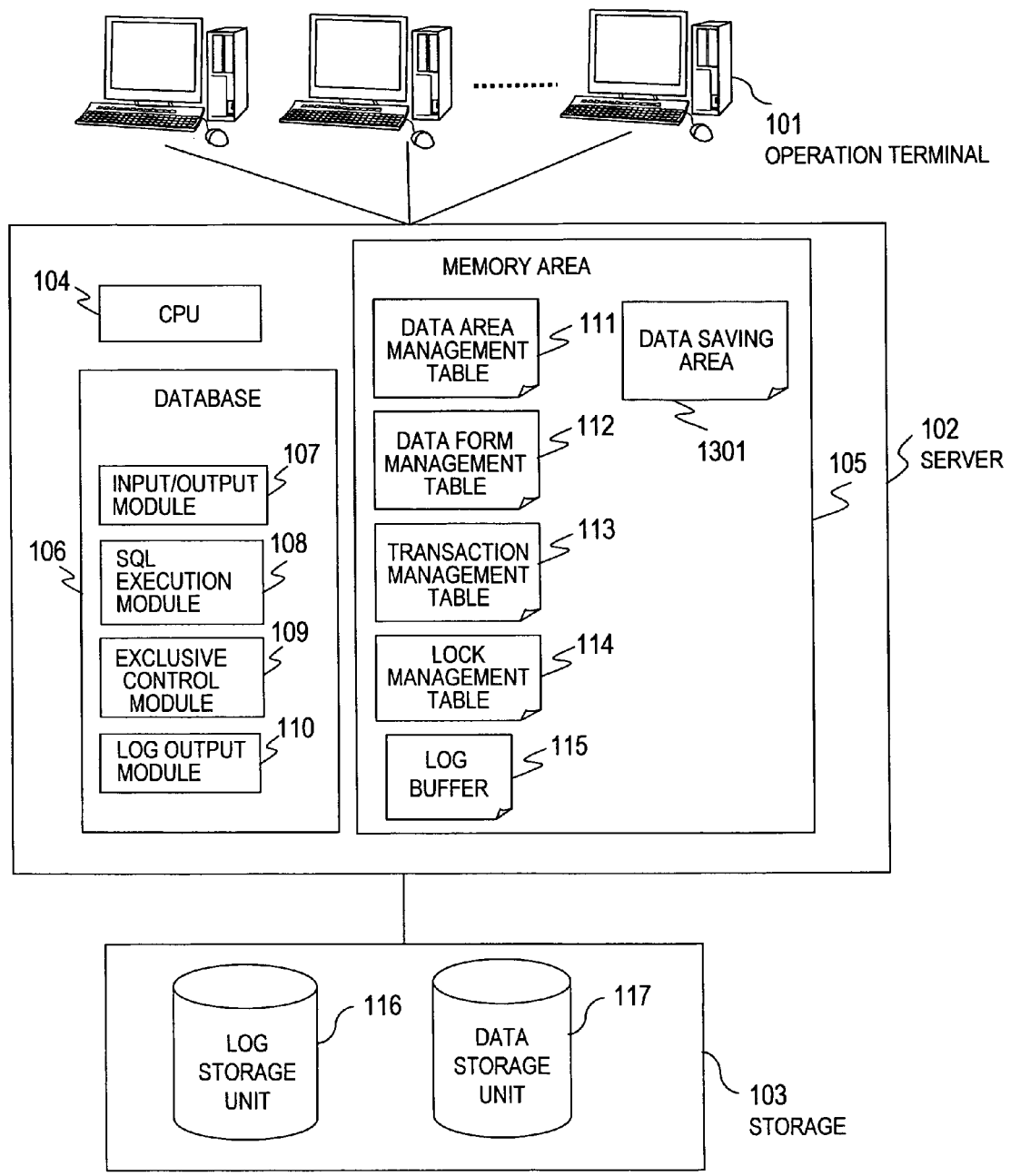
FIG. 15 is a block diagram showing a configuration of a system according to a second embodiment of this invention.

FIG. 15 shows a second embodiment which includes a data saving area 1301 for temporarily storing data in a predetermined area of the memory 105 of the first embodiment. Other components are similar to those of the first embodiment, and denoted by similar reference numerals.

In the predetermined area of the memory 105, the data saving area 1301 for copying data before updating exclusively locked as described below to permit other transactions to refer to is set. FIG. 16 shows an example of stored contents of the data saving area 1301. The data saving area 1301 stores saved data 1401 for storing data before updating, a transaction number 1402 of a transaction for exclusively using this data, and a transaction completion flag 1403 indicating whether the transaction has been completed.

In the transaction completion flag 1403, "0", is set if a transaction which has updated the data is not completed, and "1", is set if the transaction which has updated the data has been completed.

Figure 17:
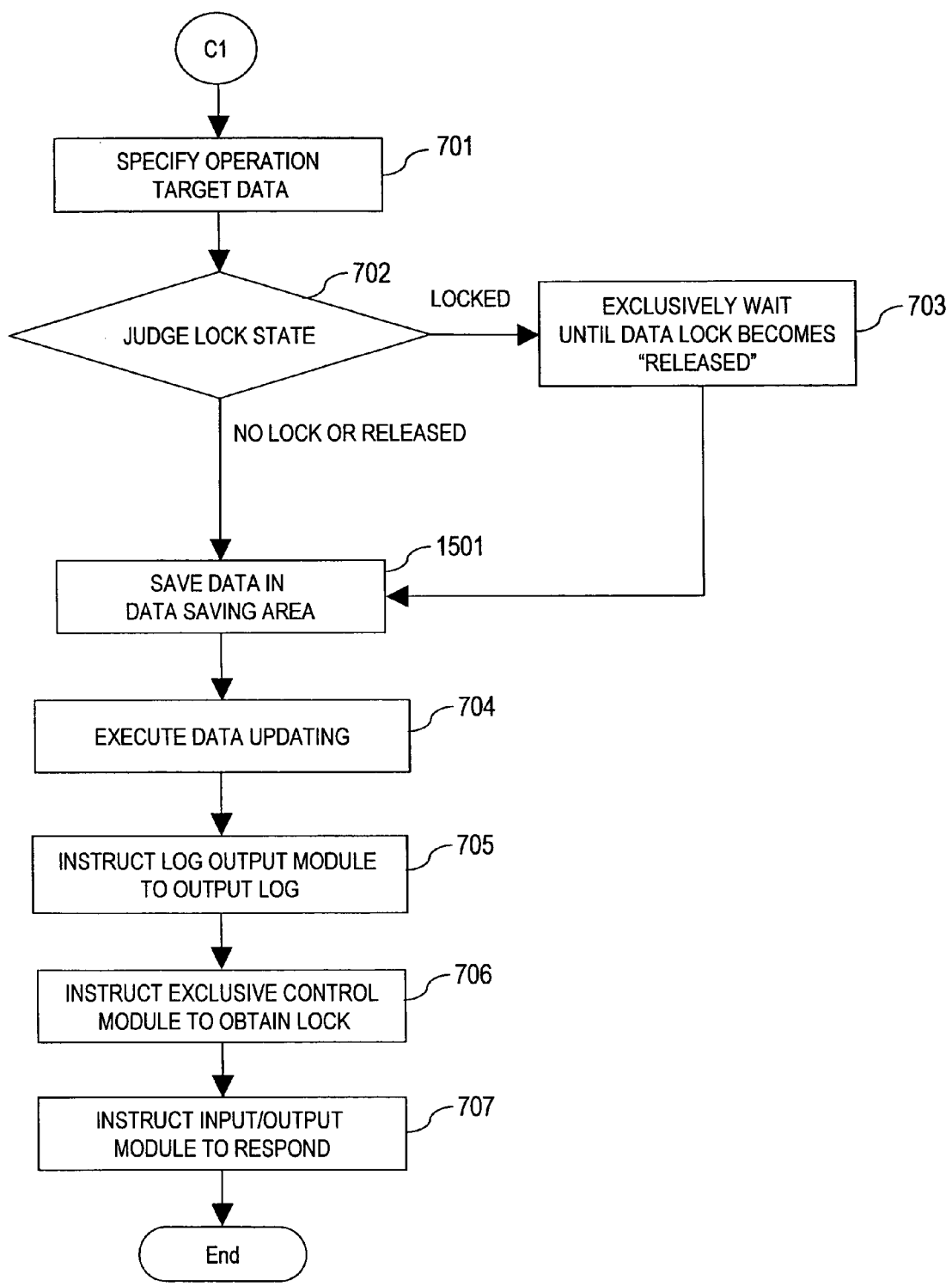
FIG. 17 is a flowchart showing an example of a commit process executed by a SQL execution module according to the second embodiment.
Figure 18:
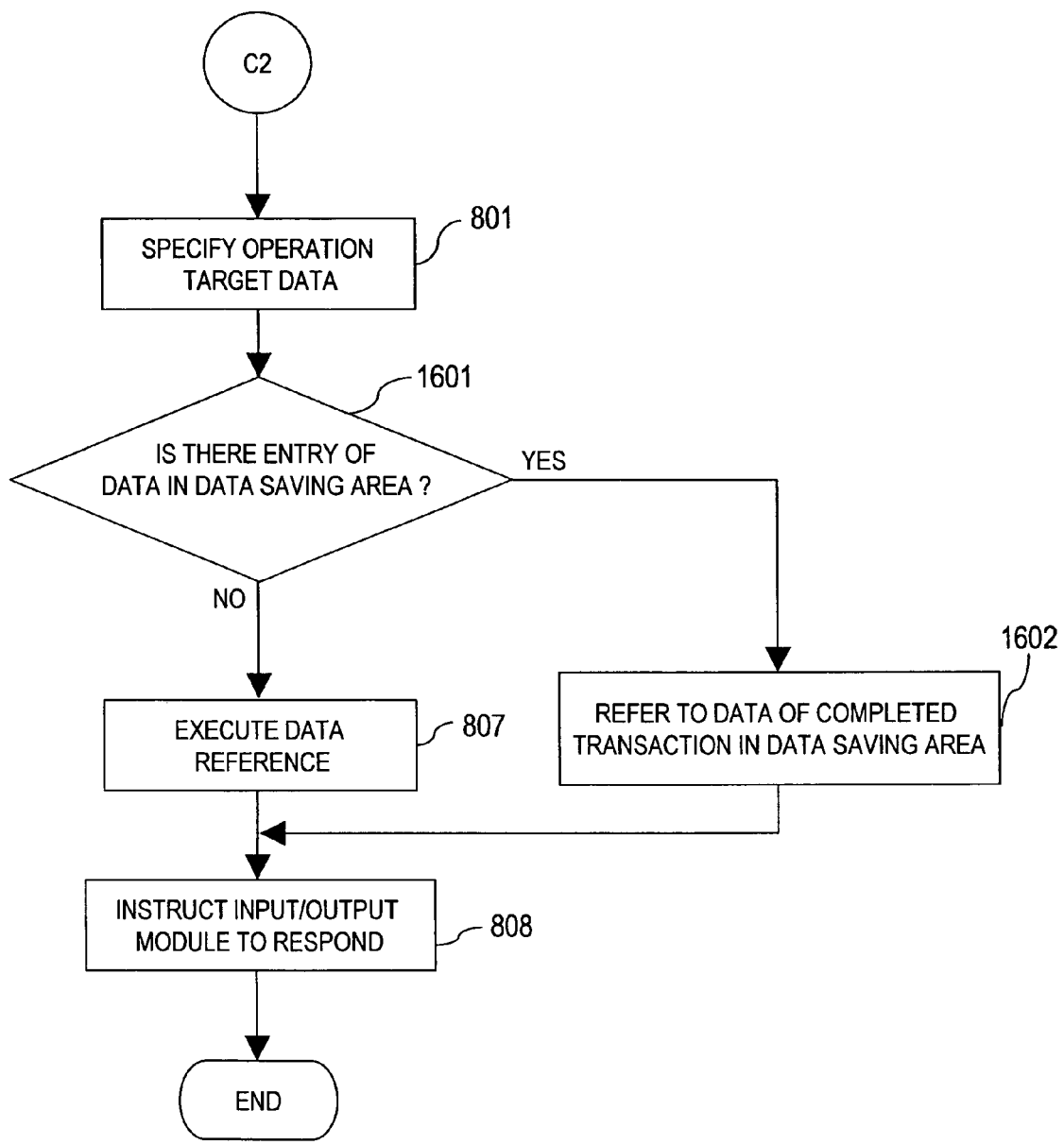
FIG. 18 is a flowchart showing an example of a reference process executed by the SQL execution module according to the second embodiment.
Figure 19:
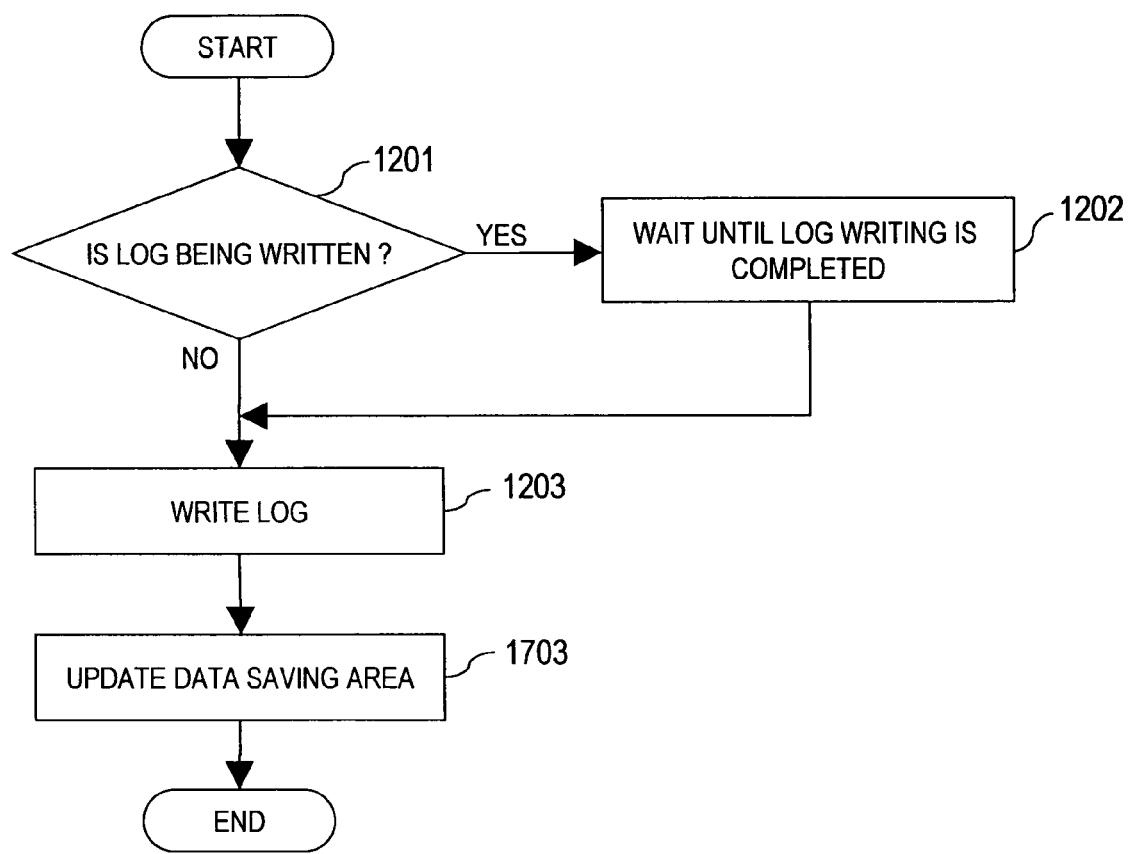
FIG. 19 is a flowchart showing an example of a process executed by a log output module according to the second embodiment.

In the case of using the multi version concurrency control (MVCC) of the conventional example, for the operation flows of the SQL execution module 108, the operation flows of the first embodiment shown in FIGS. 7 and 8 are partially changed to be as shown in FIGS. 17 and 18, and for the operation flow of the log output module 110, the flow shown in FIG. 12 is partially changed to be as shown in FIG. 19. Changes when the MVCC technology is used will be described below.

FIG. 17 is a flowchart showing an operation of the SQL execution module 108 when the data saving area 1301 is used. FIG. 17 is a flowchart where Step 1501 is added to the flowchart of the first embodiment shown in FIG. 7. Steps 701 to 707 of FIG. 17 are similar to the Steps of the first embodiment of FIG. 7, and thus description thereof will be omitted to avoid repetition.

In Step 1501, data before updating is saved in the data saving area 1301 of the memory 105. For example, in the case of executing a SQL sentence of "UPDATE STOCK SET Quantity=100 WHERE Item_ID=1", the SQL execution module 108 writes changing of Quantity of data of Item_ID=1 of the Stock table to 100 in the data saving area 1301. The transaction completion flag 1403 is "0" at a point of this time.

In Step 1501, the SQL execution module 108 judges whether data of the Item_ID=1 of the Stock table has been saved. If the data has not been saved, the date before updating is set to a transaction number 1402="−1" and to a transaction completion flag 1403="1" to be saved in the data saving area 1301.

FIG. 18 is a flowchart showing an operation of the SQL execution module 108 when a data reference instruction is received by using the data saving area 1301. In the drawing, Steps 801, 807 and 808 are similar to those of the first embodiment of FIG. 8, and thus description thereof will be omitted to avoid repetition.

In Step 1601, the SQL execution module 108 judges whether there is an entry of data designated by a reference instruction in the data saving area 1301. If there is an entry of designated data, the SQL execution module 108 proceeds to Step 1602 to refer to data of a completed transaction where the transaction completion flag 1403 of the data saving area 1301 is "1".

On the other hand, if there is no such entry in Step 1601, the SQL execution module 108 proceeds to Step 807 to refer to data of the data storage unit 117. In this case, as in the case of the first embodiment, if there is no reference permission attribute set, data reference stands by until commit completion.

FIG. 19 is a flowchart showing an operation of the log output module 110 in a case where the data saving area 1301 is used, which is obtained by partially changing the first embodiment of FIG. 12.

In Step 1701, upon outputting of a transaction completion log in Step 1203, the log output module 110 sets the transaction completion flag 1403 of the entry of the data saving area 1301 of the transaction to "1". When this change of the transaction completion flag 1403 generates data multiple-saved in the data saving area 1301 by the completed transaction, latest data is left while the other saved data are deleted.

Through the aforementioned process, when the reference data saving area 1301 is set for other transactions, and the SQL execution module 108 instructs the log output module 110 to output a log for data of an update target, contents of the data are copied to the data saving area 1301. Then, the SQL execution module 108 instructs the exclusive control module 109 to lock the data.

The other transaction (subsequent transaction B) which refers to the data can continue the process without waiting for lock releasing by referring to the data of the data saving area 1301 in place of the locked data storage unit 117. Whether the data is data of a completed transaction can be judged by referring to the transaction completion flag 1403. Accordingly, the SQL execution module 108 refers to the data of the data saving area 1301 when the data storage unit 117 is locked, and to the data storage unit 117 when the locking of the data is released. Thus, even when the transaction (preceding transaction) locks the data, the other transaction (subsequent transaction) can refer to the data. As a result, waiting time of the subsequent transaction can be shortened to improve the performance of the database 106.

As log writing of the subsequent transaction is inhibited until log writing of the preceding transaction is completed, when the log writing of the preceding transaction fails, the subsequent transaction can be made invalid. Thus, it is possible to prevent a loss of data consistency caused by the log writing failure.

Third Embodiment

Figure 20:
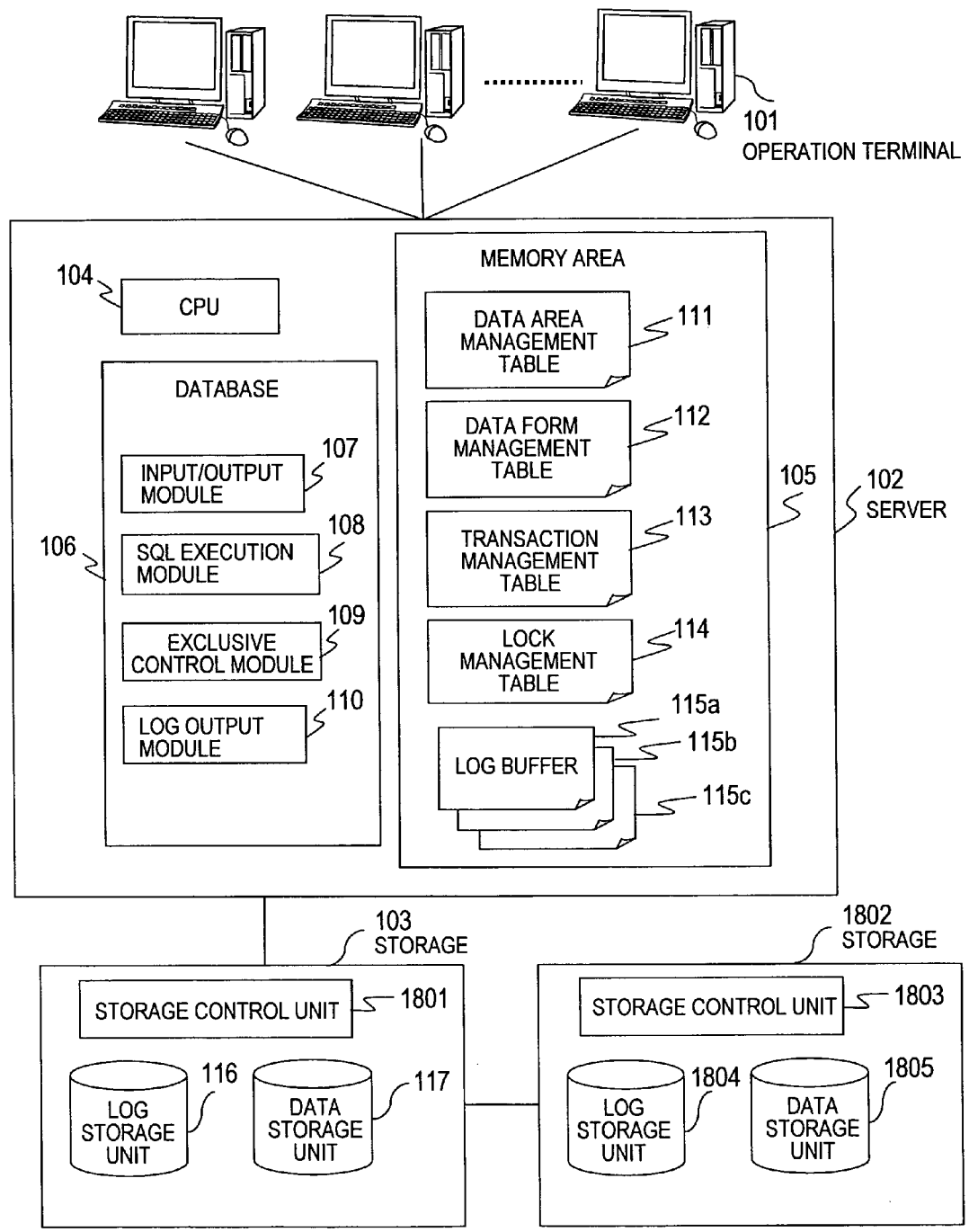
FIG. 20 is a block diagram showing a configuration of a system according to a third embodiment of this invention.

FIG. 20 shows a third embodiment, specifically a system configuration diagram where a remote copy function in addition to the storage system 103 of the first embodiment, and this invention is applied to a data remote backup system using this remote copy function. Components similar to those of the first embodiment are denoted by similar reference numerals, and overlapped description thereof will be omitted. For log buffers set in a memory 105 of a server 102, the log buffer 115 of the first embodiment includes a plurality of log buffers 115a to 115c.

A log output module 110 adds generated logs in the log buffer 115a, and when the log buffer 115a is full, it writes contents of the log buffer 115a en bloc in a log storage unit 116 of a storage system 103. This log buffer writing is called flashing. In this case, the log output module 110 switches a writing destination of the generated logs to the log buffer 115b to continue the process of a SQL execution module 108. Accordingly, the log output module 110 sequentially switches the log buffers 115a to 115c en bloc to flash contents of the log buffers 115a to 115c to the storage system 103. Thus, the log output mechanism 110 executes multiple log transfer by the plurality of log buffers 115a to 115c.

The log output module 110 writes contents of the currently used log buffers 115a to 115c in the storage system 103 when the generated logs are commit logs.

The storage system 103 includes a storage control unit 1801 for controlling a log storage unit 116 and a data storage unit 117. The storage system 103 is connected to an external storage system 1802 via a network. In the storage system 1802, a log storage unit 1804 and a data storage unit 1805 are set. In this example, the storage system 103 and the server 102 constitutes a main site, while the storage system 1802 indicates a data remote backup system constituting a sub-site.

Upon reception of a log writing instruction to the log storage unit 116 from the server 102 (or database 106), the storage control unit 1801 transmits this log writing instruction to the storage control unit 1803. The storage control unit 1803 writes logs in the log storage unit 1804 based on the log writing instruction transferred from the storage system 103, and gives a response indicating the completion of the log writing to the storage control unit 1801 of the storage system 103. The storage control unit 1801 which has received this response writes logs in the log storage unit 116 to complete the log writing.

Figure 21:
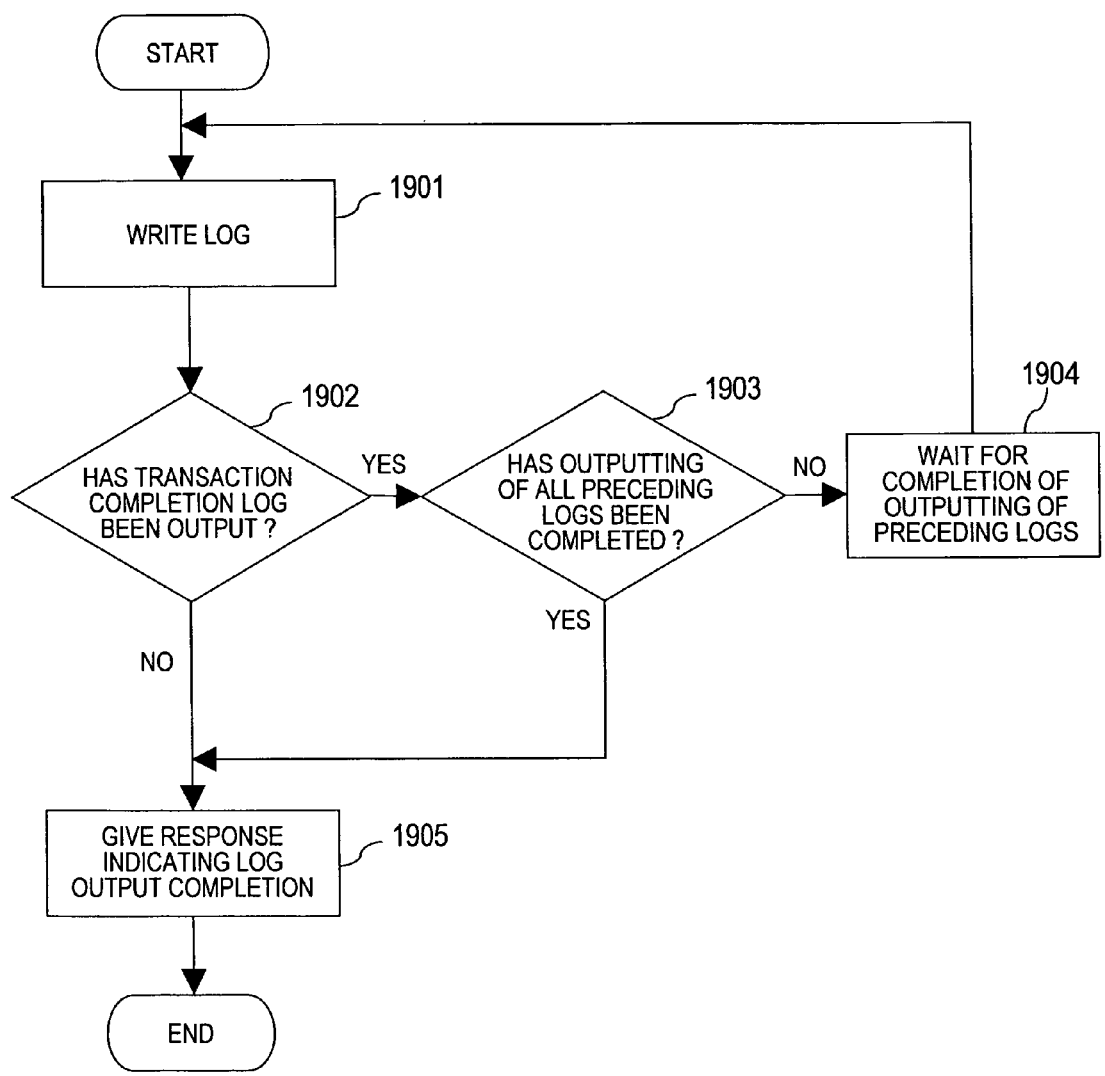
FIG. 21 is a flowchart showing an example of a process executed by a log output module according to the third embodiment.

FIG. 21 is a flowchart showing an operation of the log output module 110 when this invention is applied to the remote backup system using the remote copy function of the storage system 103. This process is executed when the log output module 110 monitors the log buffers 115a to 115c, and the buffers are filled with logs or logs written in the log buffers 115a to 115c are commit logs. The process of the flowchart shown in FIG. 21 can be executed in parallel for the plurality of log buffers.

In Step 1901, the log output module 110 outputs contents of the log buffers to the log storage unit 116 of the storage system 103.

In Step 1902, whether a transaction completion log has been output in Step 1901 is judged. If the transaction completion log has been output, the process branches to Step 1903.

In Step 1903, the log output module 110 judges whether outputting of all the previously output logs has been completed. If there is a log buffer whose outputting has not been completed, the log output module 110 proceeds to Step 1904 to wait for the completion of outputting of all the preceding log buffers. In Step 1905, a response indicating log output completion is given to the SQL execution module 110. This way, a possibility that outputting of a subsequent log buffer is completed when outputting of a preceding log buffer has not been completed can be eliminated.

Figure 22:
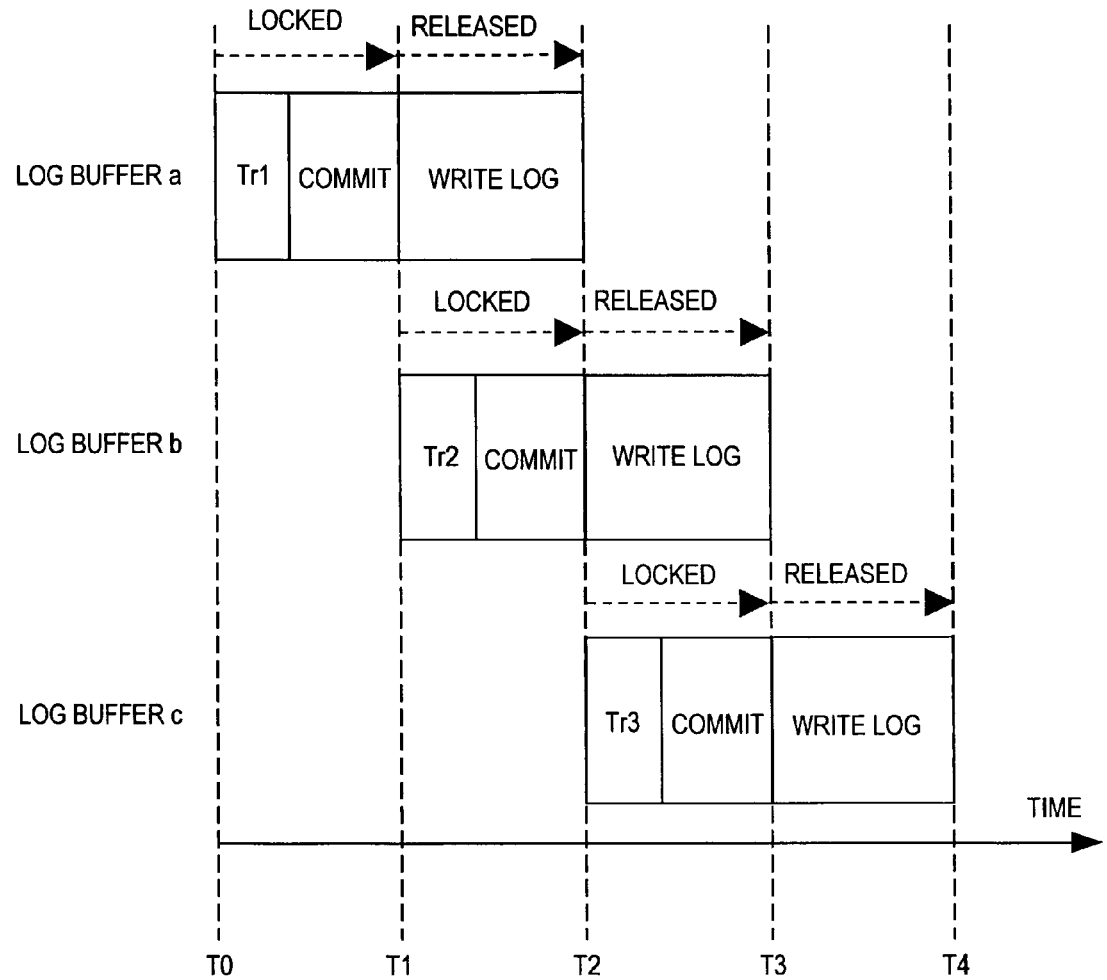
FIG. 22 is a graph showing a relation between a process and time of a transaction according to the third embodiment.

FIG. 22 is a time chart showing an operation of the third embodiment, specifically an operation when transactions Tr1 to Tr3 for updating certain data are sequentially issued.

At time T0, the transaction Tr1 is started by the database 106. When a commit of the transaction Tr1 is instructed, a log of the transaction Tr1 is written in the storage system 103 and the storage system 1802 from time T1. At time T2 when the writing is completed, the transaction completion is notified to the input/output module 107.

At time T1, an attribute of a lock of the data is set in a released state to permit operation of a subsequent transaction to the data. As in the case of the first embodiment, updating and conditional reference are permitted for the lock released data. Accordingly, the subsequent transaction Tr2 can update the data from the time T1. From the time T2 when log writing of the preceding transaction Tr1 is completed, locking of the data by the transaction Tr2 is changed to a released state. Log writing of the transaction Tr2 is started from the time T2, and the transaction Tr2 is completed at time T3.

Figure 23:
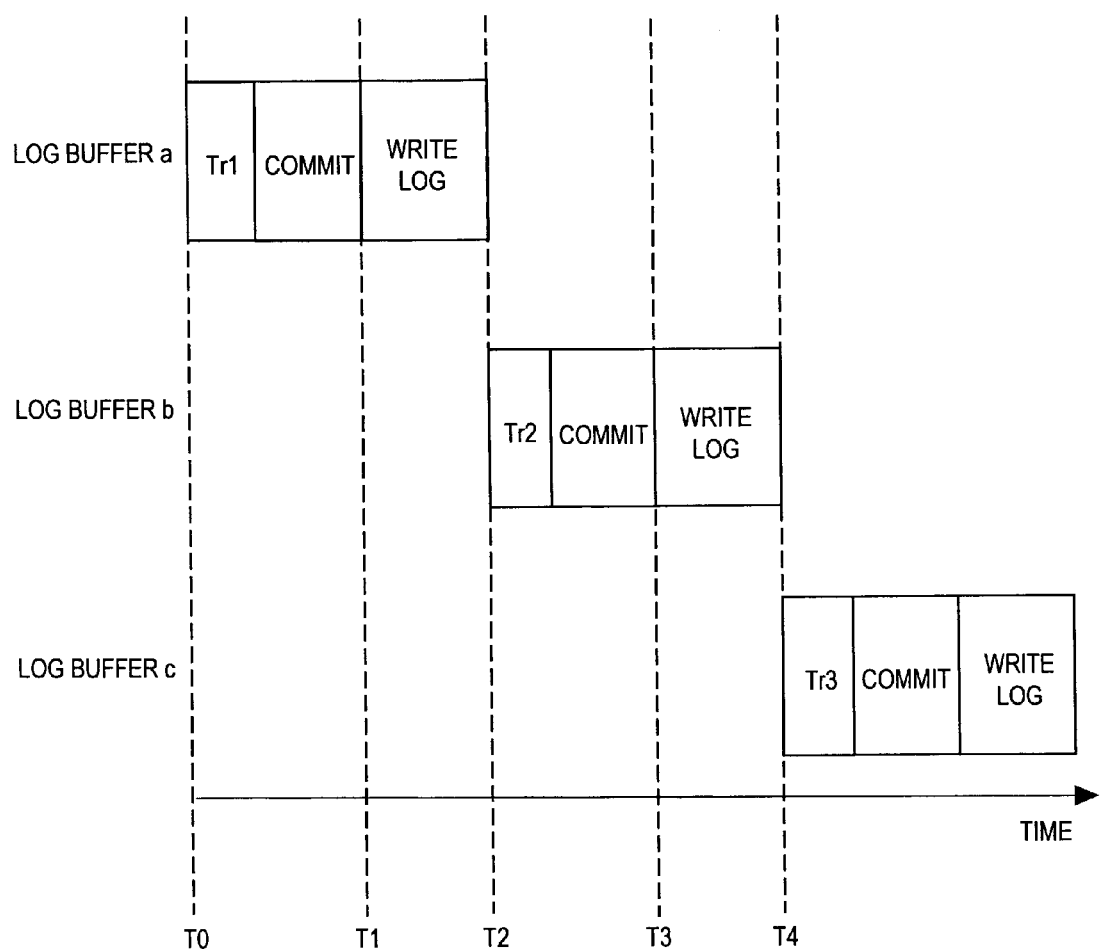
FIG. 23 is a graph showing a relation between a process and time of a transaction according to a conventional example.

As shown in FIG. 23, under conventional control, until the completion of log writing of a transaction Tr1, the data is locked to reject access from other transactions. Thus, subsequent transactions Tr2 and Tr3 cannot start processes until log writing of a preceding transaction is completed. When data is remotely backed up by using the remote copy function of the storage system 103, the transaction is completed only when writing from the storage system 103 to the storage system 1802 is completed, thus a delay by log transfer and writing is enlarged. According to this invention, by releasing locking of the data at the time of starting the commit, and by using the plurality of lot buffers 115a to 115c, the process of the subsequent transaction is executed before the completion of the preceding transaction. Thus, in the remote backup system where a delay by the log transfer and writing is large, performance of the database 106 can be improved.

The embodiment has been described by way of example where the data storage unit 117 and the log storage unit 116 are set in the storage system 103. However, this invention can be applied to a database of an in-memory where these storage units are set in the memory 105.

While the present invention has been described in detail and pictorially in the accompanying drawings, the present invention is not limited to such detail but covers various obvious modifications and equivalent arrangements, which fall within the purview of the appended claims.

What is claimed is:

1. A control method for a computer system having a computer and a storage system connected to the computer, the computer having an input module for receiving transaction execution instructions, a processor for executing received transaction execution instructions, and a memory connected to the processor, the control method comprising:

receiving, by the input module, a first transaction execution instruction designating an update to a set of data that is stored in the storage system;

setting, by the processor, an attribute to indicate a locked state for a first data unit included in the set of data designated by the transaction execution instruction, the locked state for the first data unit indicating that operations on the first data unit by transaction execution instructions other than the first transaction execution instruction are restricted;

storing, by the processor, an update log corresponding to execution of the first transaction execution instruction in a log buffer maintained in the memory connected to the processor; and upon the input module receiving a transaction completion instruction to complete the update designated by first transaction execution instruction, modifying, by the processor, the attribute from indicating the locked state to indicating a partial exclusive state for the first data unit, the partial exclusive state for the first data unit indicating that reference operations on the first data unit by transaction execution instructions are restricted and update operations on the first data unit by transaction execution instructions are not restricted, wherein modifying the attribute to indicate a partial exclusive state is performed by the processor upon a transaction completion log indicating completion of the first transaction execution instruction being stored in the log buffer;

upon storage of the transaction completion log indicating completion of the first transaction execution instruction in the storage system, modifying, by the processor, the attribute to indicate an unlocked state for the first data unit, the unlocked state for the first data unit indicating that operations on the first data unit by any transaction execution instructions are not restricted;

upon receiving a second transaction execution instruction designating a reference to the first data unit and a set of a reference permission attribute for the first data unit, executing, by the processor, the second transaction execution instruction without waiting until the attribute is modified from indicating the partial exclusive state for the first data unit to indicating the unlocked state for the first data unit.

2. The control method according to claim 1, further comprising:

upon storage of the transaction completion log indicating completion of the first transaction execution instruction in the storage system, modifying, by the processor, the attribute to indicate an unlocked state for the first data unit, the unlocked state for the first data unit indicating that operations on the first data unit by any transaction execution instructions are not restricted;

upon receiving a second transaction execution instruction designating a reference to the first data unit, waiting, by the processor, to execute the second transaction execution instruction until the attribute is modified to indicate the unlocked state for the first data unit.

3. A computer system for performing exclusive control for a storage system connected to the computer when executing received transaction execution instructions, the computer system comprising:

an input module configured to receive transaction execution instructions;

a processor configured to execute transaction execution instructions; and a memory connected to the processor, and wherein the computer system is programmed to implement a control method, the control method comprising:

receiving a first transaction execution instruction designating an update to a set of data that is stored in the storage system;

setting an attribute to indicate a locked state for a first data unit included in the set of data designated by the transaction execution instruction, the locked state for the first data unit indicating that operations on the first data unit by transaction execution instructions other than the first transaction execution instruction are restricted;

storing an update log corresponding to execution of the first transaction execution instruction in a log buffer maintained in the memory connected to the processor;

upon the input module receiving a transaction completion instruction to complete the update designated by, first transaction execution instruction, modifying, the attribute from indicating the locked state to indicating a partial exclusive state for the first data unit, the partial exclusive state for the first data unit indicating that reference operations on the first data unit by transaction execution instructions are restricted and update operations on the first data unit by transaction execution instructions are not restricted, wherein modifying the attribute to indicate a partial exclusive state is performed upon a transaction completion log indicating completion of the first transaction execution instruction being stored in the log buffer;

upon storage of the transaction completion log indicating completion of the first transaction execution instruction in the storage system, modifying the attribute to indicate an unlocked state for the first data unit, the unlocked state for the first data unit indicating that operations on the first data unit by any transaction execution instructions are not restricted;

upon receiving a second transaction execution instruction designating a reference to the first data unit and a set of a reference permission attribute for the first data unit, executing the second transaction execution instruction without waiting until the attribute is modified from indicating the partial exclusive state for the first data unit to indicating the unlocked state for the first data unit.

4. The computer system according to claim 3, wherein the control method further comprises:

upon storage of the transaction completion log indicating completion of the first transaction execution instruction in the storage system, modifying the attribute to indicate an unlocked state for the first data unit, the unlocked state for the first data unit indicating that operations on the first data unit by any transaction execution instructions are not restricted;

upon receiving a second transaction execution instruction designating a reference to the first data unit, waiting to execute the second transaction execution instruction until the attribute is modified to indicate the unlocked state for the first data unit.

* * * * *